United States Patent
Lamla et al.

(10) Patent No.: US 6,383,469 B1
(45) Date of Patent: May 7, 2002

(54) DEVICE FOR UTILIZING HEAT WHICH IS FORMED DURING A CATALYTIC REACTION

(75) Inventors: Oskar Lamla, Bissingen a.d. Teck; Carlo Saling, Dettingen/Teck; Martin Schuessler, Ulm, all of (DE)

(73) Assignee: Xcellsis GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 09/511,103

(22) Filed: Feb. 23, 2000

(30) Foreign Application Priority Data

Feb. 23, 1999 (DE) .......................... 199 07 655

(51) Int. Cl.$^7$ ................................. C01B 3/24

(52) U.S. Cl. .................. 423/652; 252/373; 422/192; 422/201; 422/211; 423/245.3

(58) Field of Search ............... 252/373; 423/418.2, 423/649, 650, 651, 652, 245.3, 437.2; 422/192, 198, 201, 211; 48/199 FM, 61

(56) References Cited

U.S. PATENT DOCUMENTS

| 4,946,667 A | 8/1990 | Beshty ............... 423/648.1 |
| 5,741,474 A | * 4/1998 | Isomura et al. ......... 423/648.1 |

FOREIGN PATENT DOCUMENTS

| DE | 197 20 294 C1 | 5/1997 | ............ C01B/3/32 |
| DE | 197 54 013 A1 | 12/1997 | ............ C01B/3/32 |
| EP | 0 921 584 | 6/1999 | ............ C01B/3/38 |
| EP | 0 924 163 | 6/1999 | ............ C01B/3/38 |
| GB | 2 217 728 A | 11/1989 | ............ C01B/3/32 |
| JP | 07133101 A | 5/1995 | ............ C01B/3/38 |

* cited by examiner

Primary Examiner—Steven P. Griffin
Assistant Examiner—Maribel Medina
(74) Attorney, Agent, or Firm—Crowell & Moring LLP

(57) ABSTRACT

A device for utilizing heat generated by a catalytic reaction has a first area for heating (vaporizing) at least one starting material which is to be reacted, particularly a reaction mixture. A second area is provided for at least partially carrying out the catalytic reaction or for further reaction of reaction products formed during the catalytic reaction and/or for at least partial cooling of reaction products formed during the catalytic reaction. The first area and the second area are in thermally conductive communication.

14 Claims, 3 Drawing Sheets

DEVICE FOR UTILIZING HEAT WHICH IS FORMED DURING A CATALYTIC REACTION

BACKGROUND AND SUMMARY OF THE INVENTION

This application claims the priority of German patent document 199 07 665.0, filed Feb. 23, 1999, the disclosure of which is expressly incorporated by reference herein.

The present invention relates to a process and apparatus for carrying out a catalytic reaction, and for utilizing heat which is formed during the catalytic reaction.

It is sought, for example in the automotive sector (but also in other mobile applications) to minimize the mass, volume and costs of necessary components. To assure a problem-free cold start, the components which are required for the driving mode must have a low total mass and must be connected to one another by gas paths which are as short as possible.

A so-called heterogeneously catalysed reaction relates, for example, to the generation of hydrogen from hydrocarbons or alcohol, particularly methanol (methanol reforming), with a reaction mixture of hydrocarbons or alcohol and water being fed to a catalytic converter. Further examples of important reactions are the reduction of the carbon monoxide content, releasing carbon dioxide, in a so-called hydrogen shift reaction; the oxidation of carbon monoxide by feeding a CO-containing gas and an $O_2$-containing gas to a catalytic converter; and the combustion of a combustible starting material with the addition of an $O_2$-containing gas in a catalytic burner.

In hydrogen-powered vehicles, the hydrogen required is usually obtained on board the vehicle from hydrocarbons, for example methanol. The process of obtaining hydrogen from methanol is based on the overall reaction $CH_3OH + H_2O \rightarrow CO_2 + 3H_2$. In practice, to carry out a reaction of this nature, a reaction mixture comprising the hydrocarbon and water vapour is heated and guided past a suitable catalytic converter to generate the desired hydrogen, in a single-step or multistep reaction sequence. A device for two-stage methanol reforming of this nature is known, for example, from European Patent Document EP 0 687 648 A1. In the known device, the reaction mixture is fed to a first reactor, in which it is only attempted to achieve partial conversion of the methanol. After it has flowed through the first reactor, the gas mixture, which still contains a certain level of unconverted starting materials, is fed to a second reactor which is optimized with regard to residual conversion.

To ensure that the catalytic converter operates efficiently, it is necessary to vaporize the starting materials before they are fed to the reactor. For this purpose, it is customary to use heat exchangers of plate or tube design, since a large heat-transfer area is required.

Heat exchangers of this nature are also used to carry out further process steps during the catalytic reaction, for example to heat or cool gases which are formed or to supply heat to catalytically active materials or to correspondingly dissipate heat from these materials.

A drawback which has emerged in known devices, used for example to generate hydrogen from hydrocarbons, is that the large number of components required, particularly heat exchangers, results in devices which overall are of a large size. However, especially for applications in the mobile sector, it is sought to keep the mass, the volume (and therefore also the costs) of the components required as low as possible.

The object of the present invention is to provide a method and apparatus which can carry out a catalytic reaction using as few components as possible.

Another object of the invention is to provide a catalytic device whose components, individually and together, are of small size.

These and other objects and advantages are achieved by the method and apparatus for utilizing heat according to the invention, in which a vaporizer or vaporizer area, which is used to vaporize starting materials that are to be reacted, is formed as a single piece (or integrally) with a second area for at least partially carrying out the catalytic reaction or for further reaction of reaction products formed during the catalytic reaction and/or for at least partially cooling reaction products formed during the catalytic reaction. For example in the case of methanol reforming, the second area may be a CO oxidizer which is used for oxidizing carbon monoxide formed during the catalytic reaction, and/or as a cooling device for cooling reformate formed during the catalytic reaction. Thermally conductive communication between the two areas makes it possible substantially to dispense with, or to reduce considerably, the use of further heat exchangers.

Advantageously, a gas-impermeable, thermally conductive partition is formed between the first and second areas. This prevents starting materials which are to be vaporized from coming into contact with CO or reformate gases which are formed during the catalytic reaction.

In order to keep the thermal stresses in the partition plane as low as possible, the direction of flow on at least one side is designed to run perpendicular to the partition plane or wall. As a result, substantially isothermal conditions are established at the partition.

According to a preferred embodiment of the heat-transfer device according to the invention, the first and/or the second areas are made substantially from porous, (particularly metallic) materials of good thermal conductivity. This measure ensures that there is a large heat-exchanging area available. A porous structure further contributes to good heat transfer, due to the intensive mixing and turbulence of gases or fluids flowing through it.

Advantageously, catalytic material may be contained in at least one of the areas.

It has proven particularly advantageous for the respective areas, particularly in the area of the partition, to have regions which are of solid design. It is thus possible to effectively improve the thermal conductivity towards the partition wall or surface.

According to a particularly preferred embodiment of the heat-utilization device according to the invention, the first and the second areas are formed concentrically with respect to one another, the first area being arranged inside, and the second area outside, a gas-impermeable partition, which is of tubular design. A configuration of this nature makes it possible to ensure that reaction products which are to be cooled, for example, act uniformly, in the radial direction, on the second area even with a small space available.

Advantageously, in the area of the partition, passages parallel to the partition are formed in the second area; via these passages it is possible to dissipate gases acting on the second area. In this manner, it is possible effectively to dissipate reaction products which have been sufficiently cooled in the second area and have thus released their useful heat in order to heat the first area, without problems from the second area.

According to an advantageous embodiment, the device for carrying out a catalytic reaction generates hydrogen from a reaction mixture containing at least one hydrocarbon (particularly methanol) and water. The catalytic converter is designed as a reformer for carrying out a reforming step (particularly a partial oxidation of the reaction mixture to produce a reformate), and an element connected downstream of the catalytic converter comprises a CO oxidizer for oxidizing carbon monoxide formed in the reformer, and/or a reformate cooler for cooling the reformate which is generated in the reformer. The result is a hydrogen-generation device which is very small and can be used in particular in the automotive sector.

According to a preferred embodiment of the invention, a device for carrying out a catalytic reaction has a further element for preheating starting materials which are fed to the heater/vaporizer, and a further element for cooling reaction products which emerge from the element connected downstream of the catalytic converter. These further elements are in thermally conductive communication, so that it is possible to make effective, optimum use of the heat formed during a catalytic reaction.

It has proven particularly advantageous for the heater/vaporizer, the element connected downstream of the catalytic converter, and the catalytic converter to be formed integrally or as a single piece. This measure provides devices for carrying out a catalytic reaction which are especially small and eminently suitable for use in the automotive sector.

According to another preferred embodiment of the invention, a process is used to generate hydrogen from at least one hydrocarbon (particularly methanol), in which the vaporized reaction mixture is reformed (particularly, partially oxidized), in order to produce a reformate in a catalytic converter which is designed as a reformer. Carbon monoxide which is formed during the reforming step is fed to a CO oxidizer, and/or the reformate which is produced in the reformer is fed to a reformate cooler, with the heat which is released during the CO oxidation and/or the reformate cooling being used to assist with the vaporization of the at least one starting material. With a process of this nature, it is possible for heat formed during the cooling of the reformate or the CO oxidation to be used simply and efficiently to vaporize the reaction mixture which is to be reacted.

Other objects, advantages and novel features of the present invention will become apparent from the following detailed description of the invention when considered in conjunction with the accompanying drawings.

DETAILED DESCRIPTION OF THE DRAWINGS

Figure 1:
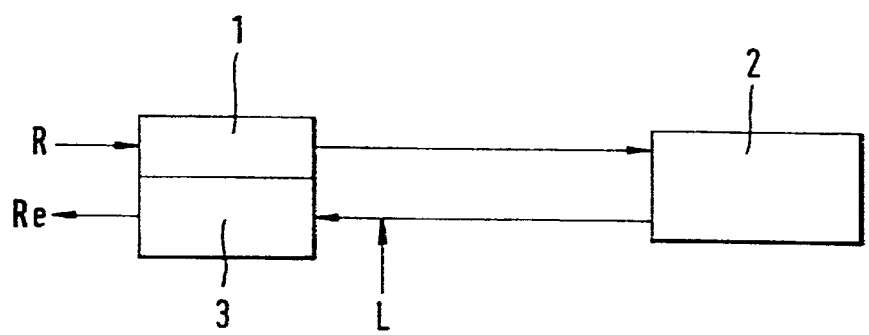
FIG. 1 is a schematic depiction of a preferred embodiment of the device for carrying out a catalytic reaction according to the invention.

FIG. 1 shows a simplified schematic depiction of the essential components of a device for carrying a catalytic reaction according to the invention, based on the example of a hydrogen-generation device. In a vaporizer 1, a reaction mixture comprising methanol and water (the supply of the reaction mixture is represented symbolically by means of the arrow R) is vaporized and fed to a reformer 2 for partial oxidation (POX reformer). An at least partial catalytic conversion of the reaction mixture to form hydrogen-containing reformate takes place in the reformer 2.

The reformate, which contains carbon monoxide (CO) in addition to hydrogen, is fed to a CO oxidizer or reformate cooler 3, in which the carbon monoxide is at least partially oxidized and, at the same time, the reformate is cooled. The cooled reformate is then (if appropriate, via further reformate coolers) fed to a fuel cell which is not shown (arrow Re). Between the reformer 2 and the CO oxidizer or reformate cooler 3, air is admixed with the reformate in order to oxidize the carbon monoxide which is present (represented symbolically by means of arrow L).

The vaporizer 1 and the component 3 are designed in such a way that they bear against one another or form a single piece and are in thermally conductive communication with one another. In this arrangement, the high heat content of the reformate generated in the reformer 2 can be transferred to the vaporizer 1 in order to vaporize the reaction mixture.

Furthermore, it is also possible to utilize the heat which is released during the CO oxidation for the same purpose. Particularly advantageously, it has been determined that it is possible to carry out selective CO oxidation with a falling temperature profile along the length of the CO oxidizer 3, due to the progressive cooling. It should be noted that the vaporization temperature of the reaction mixture in the vaporizer 1 is considerably below the temperature of the reformate emerging from the reformer 2. Thus, the reformate which is generated can be effectively cooled while at the same time the reaction mixture is being vaporized.

The short gas path, combined with the relatively low gas volume from the vaporizer to the CO oxidizer or reformate cooler side allows high dynamics.

It has proven particularly advantageous for the reformer 2 also to be formed integrally with the components 1, 3, as will be explained in more detail below with reference to a preferred exemplary embodiment of a hydrogen-generation device.

Figure 2:
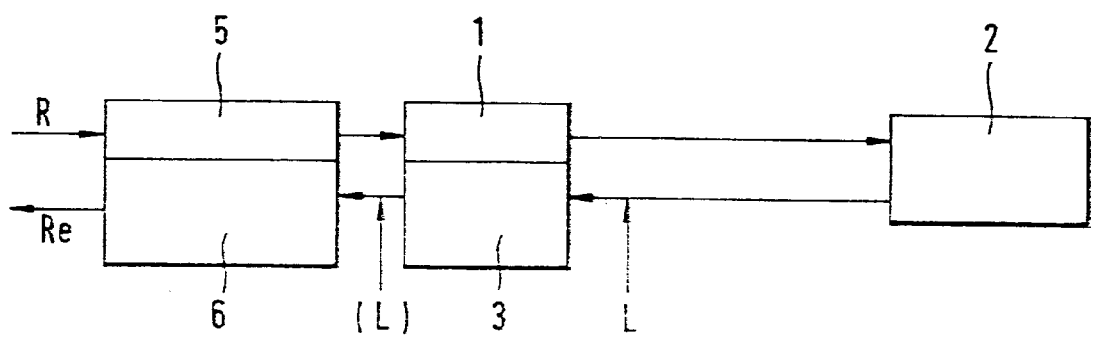
FIG. 2 shows a schematic depiction of an extended embodiment of the device for carrying out a catalytic reaction according to the invention.

FIG. 2 illustrates a further preferred embodiment of the hydrogen-generation device according to the invention, which is extended compared to the device shown in FIG. 1. That is, an element 5 for the preheating of starting materials and a further element 6 which serves as a CO oxidizer or reformate cooler have been added. In the element 5, it is possible to preheat starting materials up to vaporization level, in which case further cooling of the reformate to the fuel-cell temperature or below this temperature can be carried out in the element 6. It can be seen from this figure that further air is supplied to the reformate between the components 3 and 6 (arrow L). The elements 5 and 6 are in thermally conductive communication, in a manner similar to the integrated vaporizer/CO oxidizer or reformate cooler arrangements 1, 3.

It should be noted that if air or oxygen is added between the elements 3 and 6 (or 2 and 3), it is also possible to realize a further CO-oxidation stage in the element 6, in particular for the situation in which a corresponding catalytic converter is provided.

Figure 3:
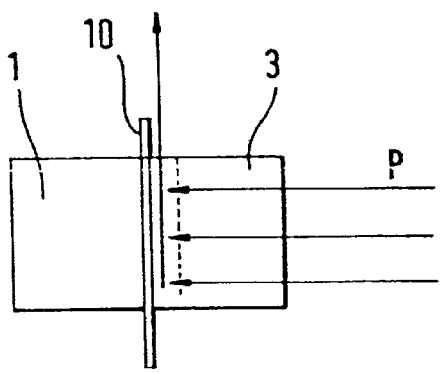
FIG. 3 shows a schematic sectional view of a device for utilizing heat formed during a catalytic reaction according to the invention.
Figure 4:
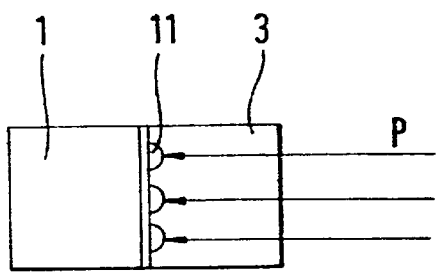
FIG. 4 shows a sectional view, rotated through 90°, of the device shown in FIG. 3.
Figure 5:
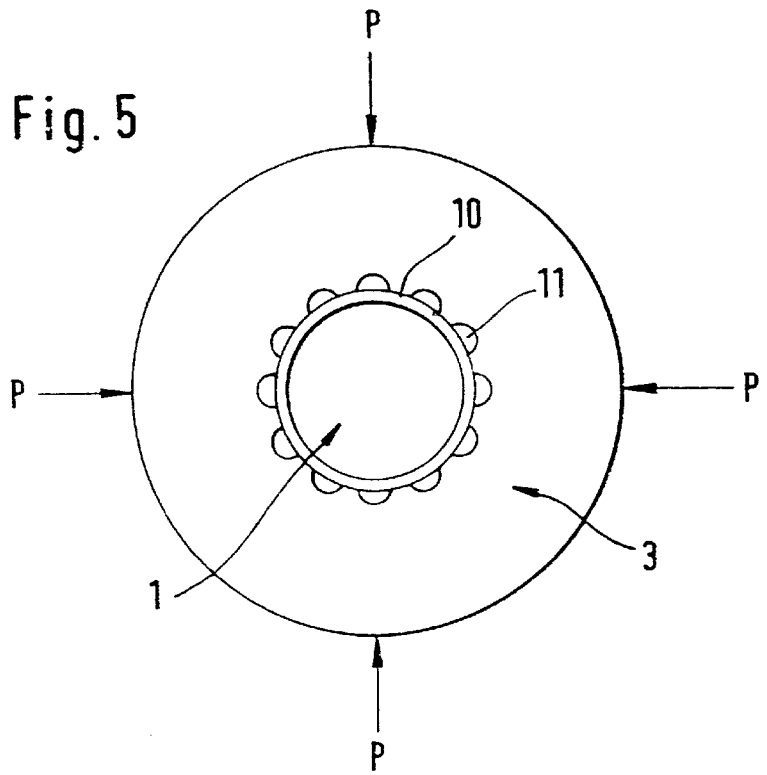
FIG. 5 shows a preferred exemplary embodiment of the device according to the invention which is shown in FIGS. 3, 4, in sectional view.

A preferred integrated design of the vaporizer 1 with the CO oxidizer or the reformate cooler 3 is illustrated in detail in FIGS. 3 to 5. The vaporizer or vaporization area of the device illustrated is again denoted by 1, and the area in which the CO oxidation of the reformate or its cooling is carried out is denoted by 3. A gas-impermeable partition 10 is formed between the areas 1 and 3, which are made from porous, metallic material with a good thermal conductivity. The result is a large heat-exchanging area. Furthermore, a porous structure of this nature ensures good heat transfer or heat absorption with regard to gases flowing through it. This effect is achieved by virtue of the intensive mixing and turbulence of the substances flowing through the porous materials. The partition is at a uniform temperature, since the direction of flow runs substantially perpendicular to the partition plane.

FIG. 4, a plan view which has been rotated through 90° with respect to FIG. 3, shows passages 11 which are formed in the area 3. These passages 11 are used to dissipate again gas, i.e. in particular reaction products or reformate, which flows through the area 3 in the direction illustrated by arrows P, i.e. perpendicular to the partition 10. This ensures that the gas, which releases its heat when it flows through the area 3, can be dissipated again without problems. The heat which is released into the area 3 can then be transferred across the gas-impermeable partition 10 to the area 1.

A particularly preferred configuration of this integrated design of vaporizer and CO oxidizer or reformate cooler is illustrated in FIG. 5. It can be seen that the areas 1, 3 are designed as concentric, circular or cylindrical areas which are separated from one another by a gas-impermeable, cylindrical partition 10. In a manner similar to that shown in FIGS. 3 and 4, passages 11 are formed in the area of the partition 10. In this case, gas which is to be cooled flows radially onto or through the outer area 3, as indicated by the arrows P in FIG. 5. Starting materials which are to be heated or vaporized in this case flow axially through the inner area 1, i.e., in the illustration shown in FIG. 5, into or out of the plane of the drawing. The gas which flows radially through the outer area 3 releases its heat to the porous material of the area 3 and flows through the passages 11 running parallel to the partition 10 (i.e., in the illustration shown in FIG. 5, once again into or out of the plane of the drawing). The heat which is released in the outer area 3 is transferred through the partition 10 to the inner area 1 in order to assist with vaporization of the starting materials which are flowing through the inner area 1.

Figure 6:
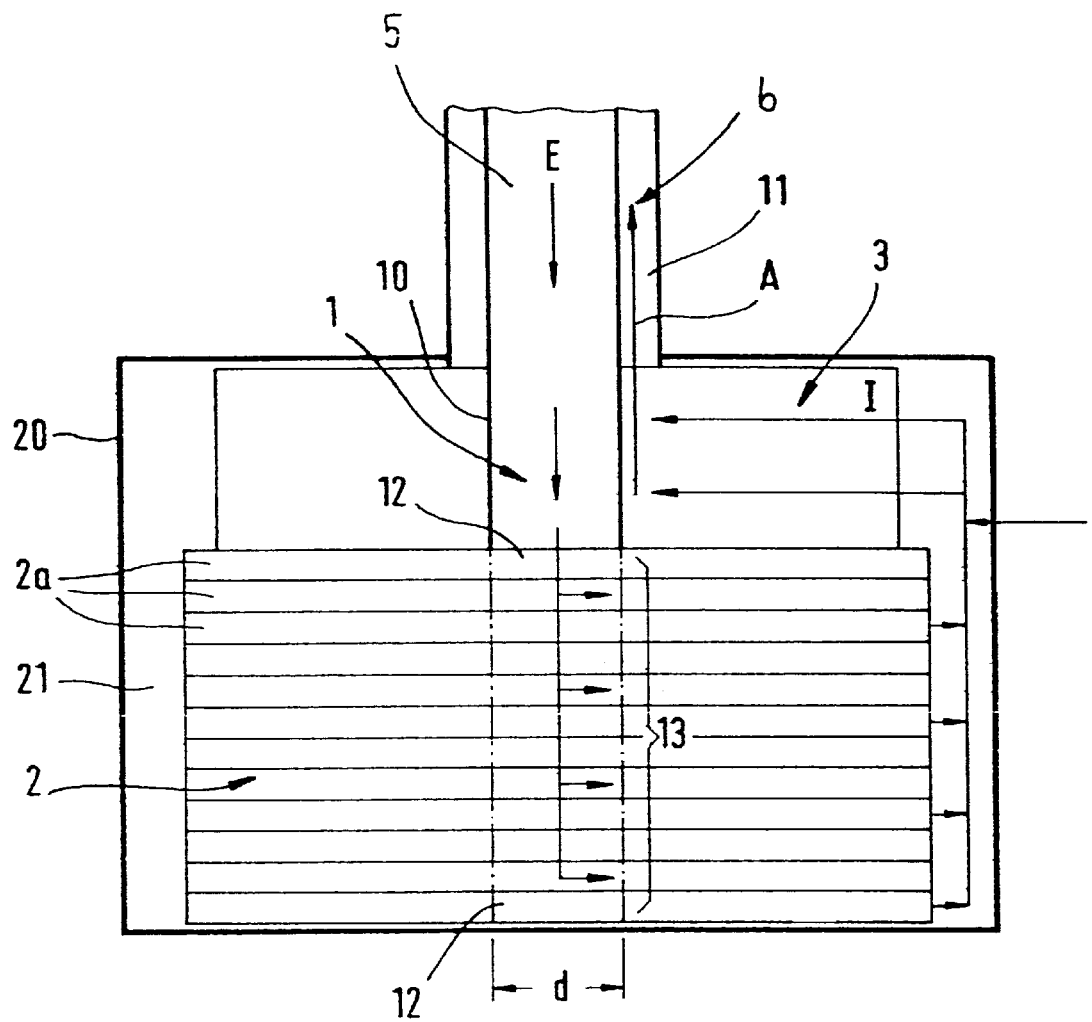
FIG. 6 shows a schematic, sectional view from the side of a preferred embodiment of the hydrogen-generation device according to the invention.

Finally, FIG. 6 shows a preferred embodiment of a hydrogen-generation device according to the invention, in which a vaporizer, a reformer and a CO oxidizer and/or a reformate cooler are formed with a single-piece or integral design. (Components which are identical to those illustrated in FIGS. 1 to 5 have the same reference numerals.)

The reformer 2 is designed as a stacked reactor, for example, comprising individual catalytic layers 2a which are stacked on top of one another. The individual catalytic layers 2a can, for example, be shaped into thin, large-area, highly compressed layers of catalytic material. The catalytic material used is, for example, a fine-grained catalytic powder or granules, the grains of which have a diameter of approximately 0.5 mm or less. The pressing takes place, for example, at temperatures of from 200° C. to 500° C.

In the embodiment illustrated, starting-material passages 12 are provided in the catalytic layers 2a and run substantially parallel to the longitudinal edges, forming a guide passage 13 which runs through continuously perpendicular to the surface plane of the catalytic layers 2a and is shown in dot-dashed lines. The starting-material passages or the guide passage 13 is or are formed centrally in the individual catalytic layers 2a and also has/have a diameter d. The reformer 2, which is designed as a stacked reactor, has passages which are not individually illustrated and which extend through the catalytic layers 2a at right angles to the direction in which the starting-material passage 13 extends. A device as explained with reference to FIGS. 3 to 5 is arranged on the reformer 2.

The first area 1, which serves as a vaporizer, is in this case arranged in line with the starting-material passage 13. The area 3 which concentrically surrounds the area 1 and is used for CO oxidation or for reformate cooling, has a slightly shorter axial extent than that of the individual catalytic layers 2a.

Reformer 2, vaporizer 1 and CO oxidizer or reformate cooler 3 are arranged inside a housing 20. It can be seen that the housing 20 is dimensioned in such a way that a space 21 remains between the outside of the reformer 2 or the CO oxidizer/reformate cooler 3 and the housing 20.

It should be noted that the gas-impermeable partition 10 between vaporizer 1 and oxidizer/reformate cooler 3 is illustrated only diagrammatically, and the passages which are formed in the area of the partition and are used to dissipate cooled gas are not shown simply in the interior of the oxidizer/reformate cooler, for reasons of clarity. Only the extensions of the passages 11 which project out of the oxidizer/reformate cooler can be seen.

Starting materials which are to be reacted, which in the case of the production of hydrogen are usually a reaction mixture containing methanol and water, are introduced into the vaporization area 1, as indicated by the arrow E. Via the starting-material passage 13, the reaction mixture, which has been vaporized in the vaporizer 1, is introduced (via the passages, which are not individually illustrated) into the individual catalytic layers 2a, where catalytic reaction of the reaction mixture takes place. Partially reacted gases emerge at the outer sides of the catalytic layers 2a, as illustrated by the sideways arrows, are guided upwards and act on the CO oxidizer/reformate cooler 3 radially from the outside. When they are flowing radially inwards through the CO oxidizer/reformate cooler 3 (arrows I), the gases or reaction products which have been heated by the catalytic reaction release their heat and flow through the passages 11, of which only the areas projecting out of the oxidizer/reformate cooler are illustrated in FIG. 5, out of the CO oxidizer/reformate cooler 3 (arrow A). The heat which is released in the CO oxidizer/reformate cooler 3 is transferred to the vaporization area 1 in order to vaporize the gas which is flowing in.

The embodiment illustrated in FIG. 6, with an integrated design of reformer, vaporizer and CO oxidizer/reformate cooler has proven particularly advantageous in mobile applications, due to the very short gas paths and the relatively low gas volumes which can be used.

It should be noted that the arrangement which is illustrated in FIG. 6, for example, as a hydrogen-generation device can also be used for other catalytic reactions in which, on the one hand, reaction heat is formed, and on the other hand starting materials are to be heated or vaporized.

The extension of the vaporizer or vaporization area 1 is in this case preferably designed as an element for preheating starting materials, as denoted by reference numeral 5 with reference to FIG. 2. Furthermore, the illustrated extension of the passages 11 is advantageously designed as a cooling element, as denoted by reference numeral 6 with reference to FIG. 2. Such elements 5, 6 may directly adjoin the device illustrated in FIG. 6 or may be spaced apart as desired, for example by passage-like transitions as illustrated in the figure.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for carrying out a catalytic reaction comprising:
    first, in a first area vaporizing at least one starting material comprising a reaction mixture which is to be reacted;
    second, at least partially catalytically reacting the vaporized starting material;
    third, in a second area which is separated from the first area by a gas impermeable, thermally conductive partition formed in a partition plane, further reacting or cooling reaction products formed during the catalytic reaction; and
    fourth, using heat released during at least one of the second and third steps, to assist with vaporization in the first step;
    wherein said third step includes causing a flow of reaction products in the second area in a direction substantially perpendicular to the partition plane.

2. A process according to claim 1 for generating hydrogen from a reaction mixture which contains at least one hydrocarbon and water, wherein:
    vaporized reaction mixture is reformed to produce a reformate in a catalytic converter which is designed as a reformer;
    at least one of carbon monoxide formed during reforming is fed to a CO oxidizer, and the reformate produced in the reformer is fed to a reformate cooler; and
    heat released during the CO oxidation and/or the reformate cooling is used to assist with vaporization of the reaction mixture.

3. A device for utilizing heat generated during a catalytic reaction, comprising:
    a first area for heating at least one starting material which is to be reacted;
    a second area, which is in thermally conductive communication with the first area, for one of at least partially carrying out the catalytic reaction, further reaction of reaction products formed during the catalytic reaction, and at least partial cooling of reaction products formed during the catalytic reaction;
    a gas-impermeable, thermally conductive partition formed in a partition plane between the first area and the second area; and
    a gas flow space which receives a gas flow from said first area, and is connected to guide a flow of reaction products in the second area, in a direction substantially perpendicular to the partition plane.

4. The device according to claim 3 wherein at least one of the first area and the second area comprises a thermally conductive porous material.

5. The device according to claim 4, wherein the at least one of the first and second areas in the vicinity of the partition, have regions which are not porous.

6. The device according to claim 4 wherein the porous material comprises a metal.

7. The device according to claim 3, wherein a catalytic material is provided in at least one of the first and second areas.

8. The device according to claim 3, wherein:
    the first area and the second area are formed concentrically with respect to one another;
    the first area is arranged inside, and the second area outside, the gas-impermeable partition; and
    the gas impermeable partition is of tubular design.

9. A device for carrying out a catalytic reaction, comprising:
    a heater for heating or vaporizing at least one starting material which is to be reacted;
    a catalytic converter for at least partially carrying out the catalytic reaction;
    an element which is connected downstream of the catalytic converter and is in thermally conductive communication with the heater, for at least one of further reaction and cooling of reaction products formed during the catalytic reaction;
    a gas-impermeable, thermally conductive partition formed in a partition plane between the heater and the downstream element; and
    a gas flow space which receives a flow of reaction products from said catalytic converter, and is connected to guide a flow of reaction products in the downstream element, in a direction substantially perpendicular to the partition plane.

10. The device according to claim 9 for generating hydrogen from a reaction mixture containing at least one hydrocarbon and water, wherein:
    the catalytic converter comprises a reformer for carrying out a reforming of the reaction mixture to produce a reformate; and
    the downstream element comprises one of a CO oxidizer for oxidizing carbon monoxide formed in the reformer, and a reformate cooler for cooling the reformate which is generated in the reformer.

11. The device according to claim 9, further comprises:
    a first additional element for preheating starting materials which are fed to the heater; and
    a second additional element for further cooling of reaction products;
    wherein the first and second additional elements are in thermally conductive communication.

12. The device according to claim 9, wherein the heater, the element connected downstream of the catalytic converter, and the catalytic converter are formed integrally or as a single piece.

13. A device for utilizing heat generated during a catalytic reaction, comprising:
    a first area for heating at least one starting material which is to be reacted;
    a second area, which is in thermally conductive communication with the first area, for one of at least partially carrying out the catalytic reaction, further reaction of reaction products formed during the catalytic reaction, and at least partial cooling of reaction products formed during the catalytic reaction; and
    a gas-impermeable, thermally conductive partition formed in a partition plane between the first area and the second area; wherein,
    said second area comprises an input portion and an output portion which define a gas flow path therebetween;

said outlet portion is substantially adjacent said partition plane; and said gas flow path is disposed in a direction substantially in a direction substantially perpendicular to the partition plane.

14. A device for carrying out a catalytic reaction, comprising:

a heater for heating or vaporizing at least one starting material which is to be reacted;

a catalytic converter for at least partially carrying out the catalytic reaction;

an element which is connected downstream of the catalytic converter and is in thermally conductive communication with the heater, for at least one of further reaction and cooling of reaction products formed during the catalytic reaction;

a gas-impermeable, thermally conductive partition formed in a partition plane between the heater and the downstream element; wherein said second area comprises an input portion and an output portion which define a gas flow path therebetween;

said outlet portion is substantially adjacent said partition plane; and said gas flow path is disposed in a direction substantially in a direction substantially perpendicular to the partition plane.

* * * * *